United States Patent [19]
Gitlin et al.

[11] Patent Number: 5,056,117
[45] Date of Patent: Oct. 8, 1991

[54] DECISION FEEDBACK EQUALIZATION WITH TRELLIS CODING

[75] Inventors: Richard D. Gitlin, Little Silver; Nicholas A. Zervos, Holmdel, both of N.J.

[73] Assignee: AT&T Bell Laboratories, Murray Hill, N.J.

[21] Appl. No.: 390,005

[22] Filed: Aug. 7, 1989

[51] Int. Cl.[5] ............................................. H04B 1/10
[52] U.S. Cl. ..................................... 375/102; 371/43; 375/39
[58] Field of Search ....................... 375/11, 12, 14, 27, 375/34, 39, 67, 90, 101, 102; 371/43, 44, 45; 333/18

[56] References Cited

U.S. PATENT DOCUMENTS

| | | | |
|---|---|---|---|
| 4,631,735 | 12/1986 | Qureshi | 371/43 |
| 4,660,214 | 4/1987 | Pahlavan et al. | 325/39 |
| 4,759,039 | 7/1988 | Debus, Jr. et al. | 375/39 |
| 4,862,481 | 8/1989 | Dzung | 371/43 |
| 4,905,254 | 2/1990 | Bergmans | 375/14 |
| 4,924,492 | 5/1990 | Gitlin et al. | 371/43 |

*Primary Examiner*—Stephen Chin
*Attorney, Agent, or Firm*—Ronald D. Slusky

[57] ABSTRACT

In a telephone local loop transmission arrangement, data is communicated from the customer premises to the central office utilizing a multidimensional, passband signal illustratively at 480 kb/s. Specifically, the transmitted signal is encoded in a trellis code and the received signal is processed by a circuitry that implements decision feedback equalization in combination with trellis decoding.

32 Claims, 4 Drawing Sheets

| Y2, Y1, Y0 | SUBSET |
|---|---|
| 000 | a |
| 001 | e |
| 010 | c |
| 011 | g |
| 100 | b |
| 101 | f |
| 110 | d |
| 111 | h |

DECISION FEEDBACK EQUALIZATION WITH TRELLIS CODING

BACKGROUND OF THE INVENTION

The present invention relates to data communication systems and, in particular, to channel coding and equalization in such systems.

Much attention has been focused in recent years on signal-space codes which provide so-called coding gain. Prominent among these are the so-called "trellis" codes described in such papers as G. Ungerboeck, "Channel Coding with Multilevel/Phase Signals," *IEEE Trans. Information Theory*, IT-28, 1982, pages 55-67; A. R. Calderbank and N. J. A. Sloane, "A New Family of Codes for Dial-Up Voice Lines," *Procceedings of the IEEE Global Telecomm. Conf.*, November, 1984, pages 20.2.1-20.2.4; A. R. Calderbank and N. J. A. Sloane, "Four-Dimensional Modulation With an Eight-State Trellis Code," *AT&T Technical Journal*, Vol. 64, No. 5, May-June, 1985, pages 1005-1018; A. R. Calderbank and N. J. A. Sloane, "An Eight-Dimensional Trellis Code," *Proceedings of the IEEE*, Vol. 74, No. 5, May 1986, pages 757-759; and L. -F. Wei, "Rotationally Invariant Convolutional Channel Coding with Expanded Signal Space—Part I: 180 Degrees and Part II: Nonlinear Codes," *IEEE J. Select. Areas Commun.*, Vol. SAC-2, September, 1984, pages 659-686, all of which are hereby incorporated by reference. Commercial use of these codes has, for the most part, been concentrated in voiceband data sets and other carrier data communication systems.

Furthermore, a great deal of research has been done on decision feedback equalization (DFE). Specifically, DFE was first explored theoretically in M. E. Austin, "Decision Feedback Equalization for Digital Communication over Dispersive Channels," *M.I.T. R.L.E. Technical Report* 461, August, 1967. The theory of DFE was subsequently fully dissected in R. Price, "Nonlinearly Feedback-Equalized PAM vs. Capacity for Noisy Linear Channels," *Rec. IEEE Int. Conf. Commun.*, Philadelphia, Pa., June 19-21, 1972, pages 22.12-22.17; and J. Salz, "Optimum Mean-Square Decision Feedback Equalization," *AT&T Bell System Technical Journal* Vol. 52, No. 8. October, 1973, pages 1341-1373. The application of DFE for voice-band data transmission was evaluated in terms of its performance as in D. D. Falconer, "Application of Passband Decision Feedback Equalization in Two-Dimensional Data Communication Systems," *IEEE Trans. Commun.*, Vol. Com-24, No. 10, October, 1976, pages 1159-1166; D. D. Falconer and F. R. Magee, "Evaluation of Decision Feedback Equalization and Viterbi Algorithm Detection for Voiceband Data Transmission - Part I," *IEEE Trans. Commun.*, Vol. Com-24, No. 10, October, 1976, pages 1130-1139; and D. D. Falconer and F. R. Magee, "Evaluation of Decision Feedback Equalization and Viterbi Algorithm Detection for Voiceband Data Transmission - Part II," *IEEE Trans. Commun.*, Vol. Com-24, No. 11, November, 1976, pages 1238-1245. Performance comparisons between DFE and other schemes for data transmission over, for example, a cross-talk dominated channel were made in papers such as N. A. Zervos and I. Kalet, "Optimized Decision Feedback Equalization Versus Optimized Orthogonal Frequency Division Multiplexing for High-Speed Data Transmission Over the Local Cable Network," *Proceedings of the Int. Conf. on Communications*, June, 1989, Boston, Mass. All of the aforementioned publications are hereby incorporated by reference.

The technique of DFE focuses on correcting intersymbol interference that impairs data signals when transmitted over, for example, voice-band and cable channels. Specifically, DFE combines the use of some linear equalization—needed to equalize the so-called precursors in the line signal—with a filtering of priorly formed data decisions—used to equalize the so-called post-cursors. The intersymbol interference problem is exacerbated when the data signals are transmitted over the so-called dispersive bandlimited channels at a relatively high rate. DFE, unlike conventional linear equalization, corrects such a problem without incurring a significant enhancement of the noise present in the received signals.

An example of the aforementioned dispersive bandlimited channel is a two-wire pair or "local loop" of a telephone cable network that connects customer premises to a telephone central office. Thus, the DFE technique would be particularly useful for implementing Integrated Services Digital Network (ISDN) service which will demand high signal rates on such local loops in the coming decade. In particular, ISDN will provide, using a) a unified addressing and signaling scheme and b) a single physical point of access, the capabilities that are now provided by a host of separate networks, such as voice, circuit-data, packet-data, telex, private-line networks, etc. Central to the implementation of ISDN is the notion of completing the digitalization of the telephone network by providing a customer with duplex, i.e., simultaneous two-directional, digital transmission capability to the central office over the single two-wire pair or local loop at a distance of up to 18 kft at speeds ranging from the so-called ISDN "basic" (2B+D) rate (with framing, maintenance and control bits) of 160 kb/s up to the so called "primary" (23B+D) rate (again with framing, maintenance and control bits) of 1.544 Mb/s and even beyond.

A conventional equalizer that implements DFE structurally comprises a feedforward section normally made up of a feedforward (FF) linear filter and a decision feedback section normally made up of a feedback (FB) linear filter. Theoretically, the FF and FB linear filters can be of infinite order. This being so, the equalization can be optimized based on the criteria of (1) the so-called probability of error and (2) the so-called mean-squared error. That is, for a given channel of fixed characteristics, one can theoretically determine two individual sets of coefficients associated with the FF and FB linear filters to respectively minimize (1) and (2). Assuming a high signal-to-noise ratio (SNR) in a particular communication system, those two individual sets of coefficients become identical.

Nevertheless, in practice, one cannot implement linear filters of infinite order which conceivably contain an infinite number of coefficients, not to mention to update such a number of coefficients to adapt to a real channel whose characteristics, of course, are not fixed in time. In the prior art, decision feedback equalizers implement finite-order FF and FB linear filters, some or all of whose coefficients can dynamically be updated in accordance with the changing channel characteristics. Examples of these equalizers are one comprised of an FF filter with fixed coefficients and an FB filter with coefficients updatable as described in R. B. Blake, et al., "An ISDN 2B+D Basic Access Transmission System,"

International Symposium on Subscriber Loop Service, Sept. 29–Oct. 3, Tokyo, Japan, hereby incorporated by reference, and another one comprised of FF and FB filters, all of whose coefficients are updatable as described in K. Watanabe, K. Inoue, Y. Sato, "A 4800 BPS Microprocessor Data Modem," *Data National Telecommunication Conference*, 47.6-252–47.6-256, also hereby incorporated by reference.

SUMMARY OF THE INVENTION

Use of such prior art decision feedback equalizers does not guarantee the theoretical optimal results that (1) the signal output of a decision feedback equalizer is substantially free of intersymbol interference; (2) the SNR at the output of the equalizer is maximum possible; and (3) the sampled-data noise emanating from the feedforward section of the equalizer is Gaussian or "white."

The DFE arrangement embodying the principles of the present invention achieves, for all practical purposes, the theoretical optimal results as enumerated hereinbefore using linear filters of finite order.

In particular, the feedforward section of the present DFE arrangement, after processing the received data samples, renders an output of sampled signals containing noise that is "white," even if the dominant type of noise in the received data samples is not white, as is the case in many communication environments including the local loop in the present illustrative embodiment. In a setting where the received data is encoded in a trellis code, by providing, in accordance with the present invention, such an output of the feedforward section to a trellis decoder, one can advantageously realize substantially the full coding gain of the trellis code used. This stems from the fact that the trellis codes that have been developed to date, including, for example, the code used in the present illustrative embodiment are known to provide coding gain in the presence of "white" noise.

Furthermore, the operation of a DFE arrangement involves a feedback process, using recent decisions as to the values of transmitted symbols, as part of the trellis decoding. However, the trellis decoding is susceptible to feedback errors caused by, for example, use of relatively inaccurate decisions in the feedback process.

In accordance with the present invention, the trellis decoder provides tentative decisions defined by the so-called "survival paths" based on the Viterbi algorithm as the most recent decisions for the feedback process so as to advantageously minimize those feedback errors.

DETAILED DESCRIPTION

Figure 1:
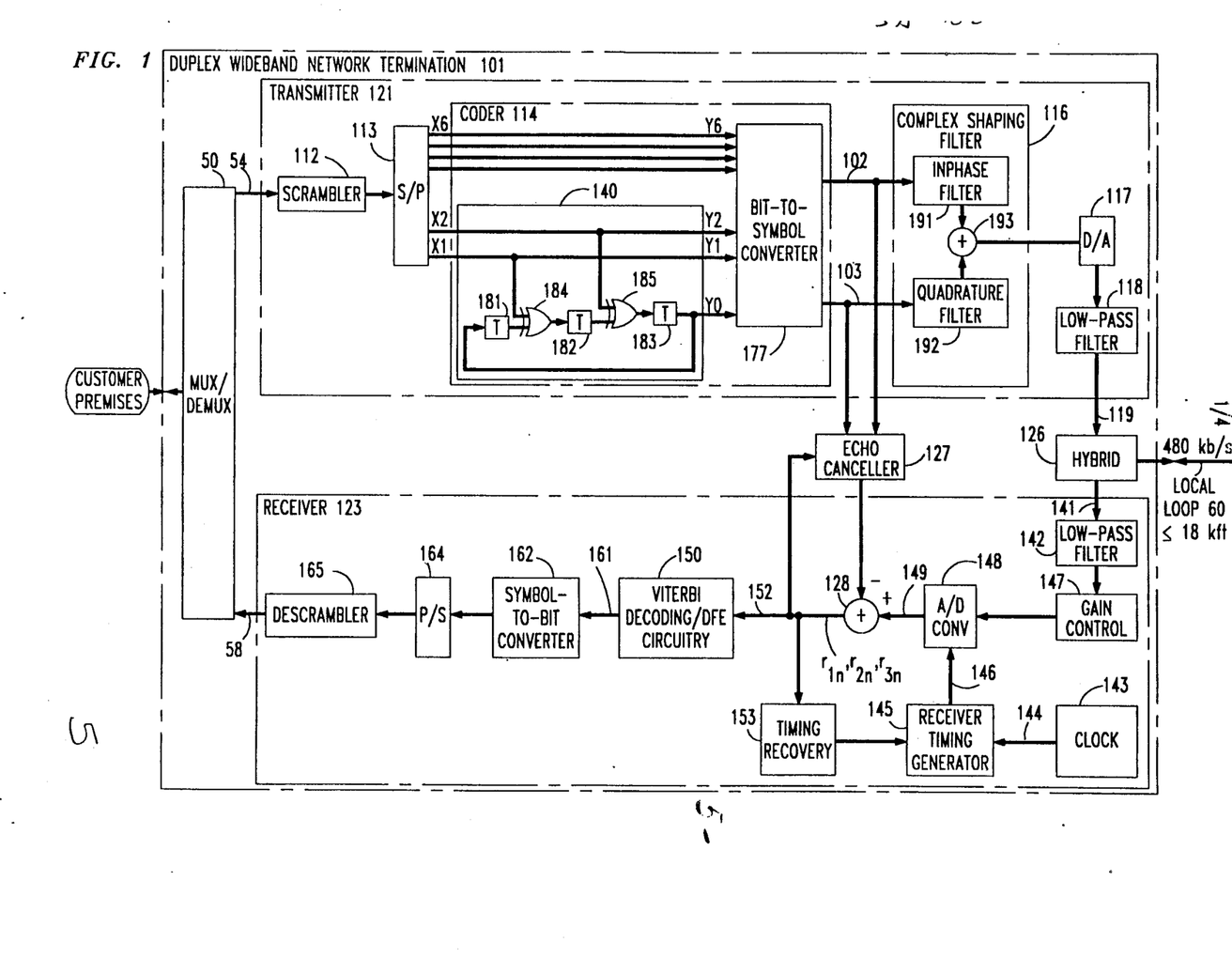
FIG. 1 shows a block diagram of a duplex wideband network termination embodying the principles of the present invention, which is illustratively used in a telephone local loop data transmission scheme.

FIG. 1 shows duplex wideband network termination (DWNT) 101 which embodies the principles of the present invention. In this particular embodiment, DWNT 101 is illustratively used to communicate between customer premises and a central office in a duplex mode via a two-wire pair or "local loop".

Specifically, data from various digital signal sources, such as a simple computer terminal, a cluster controller, a minicomputer, a digital video signal source, etc. on the customer premises is applied to a mux/demux 50. The latter embeds the signals from these sources in an outbound 480 kb/s data stream on lead 54. That data stream could be formatted, for example, using an ISDN-type format, although an ISDN standard for 480 kb/s has not yet been adopted. The data stream on lead 54 is input to the aforementioned DWNT 101, which communicates its input data to a central office via two-wire local loop 60 of a maximum length of 18 kft per ISDN standards. Within the central office, the bit stream is recovered from the transmitted line signal by a duplex wideband line termination (DWLT) associated with DWNT 101 and, after being demultiplexed, is passed to a digital switch. The latter may be, for example, a 5ESS switch manufactured by AT&T which includes software which processes the framing, maintenance, and/or control information carried in the so-called "D" channel of the ISDN signal.

In each direction of transmission, the functions performed by DWNT 101 and the associated DWLT are the opposite of what they are in the other direction. Thus, data from the digital switch destined for the customer premises, also at 480 kb/s, is passed to the DWLT which generates a line signal representing that data. The line signal is then transmitted over local loop 60 to DWNT 101 which then recovers the data and passes it to the customer premises. Indeed, the circuitry within DWNT 101 and the associated DWLT is very similar to that in the other and, as far as the generation and processing of line signals is concerned, they may be regarded as being identical.

In general, a DWNT embodying the principles of the present invention can be manufactured with the capability of operating over a range of bit rates, with the bit rate actually used at a particular time being either selected manually via, say, a front panel control or adaptively by the DWNT/DWLT pair themselves during their start-up sequence.

Referring back to FIG. 1, specifically, the aforementioned 480 kb/s signal on lead 54 is received by transmitter section 121 within DWNT 101 and is applied therewithin to a scrambler 112. The latter, in a conventional fashion, randomizes the data so as to eliminate the possibilities of generating tones within the line signal ultimately to be generated. Scrambler 112 may be, for example, of the type shown in U.S. Pat. Nos. 3,515,805 issued June 2, 1970, to R. Fracassi and 4,304,962 issued Dec. 8, 1981 to R. Fracassi, et al. Scramblers of this type are also described in polynomial form in CCITT V.32 Recommendation, "A Family of 2-Wire, Duplex Modems Operating at Data Signaling Rates of up to 9600 Bit/s for Use on the General Switched Telephone Network and on Leased Telephone-Type Circuits," *Red Book, Volume VIII - Fascicle VIII-1, Data Communications Over the Telephone Network, VIIIth Plenary*

*Assembly*, Malaga-Torremolinos, pp. 221-238, Oct. 8-19, 1984. The output bits of scrambler 112, still at a 480 kb/s rate, are thereupon converted to six-bit words by serial-to-parallel converter 113, the bits of each such word being denoted X1 through X6. These six-bit words, occurring at 480,000/6=80,000 per second, are thereupon mapped by a coder 114 into a stream of channel symbols—one symbol for each word—yielding a symbol rate of 80 kilobaud.

Specifically, coder 114 expands the six-bit words received from serial-to-parallel converter 113 into seven-bit words comprised of bits Y0 through Y6. Bits Y0, Y1 and Y2 are generated by trellis coder 140 within coder 114 in response to bits X1 and X2, as described in further detail hereinbelow, while bits Y3 through Y6 are identical to bits X3 through X6. Still within coder 114, bits Y0 through Y6 are applied to bit-to-symbol converter 177, which maps each of the $2^7=128$ different combinations of the values of those bits into one of a predetermined constellation of 128 two-dimensional channel symbols shown in FIG. 2. More specifically, each of the 128 channel symbols of the constellation is assigned to a particular one of eight partitions, or subsets, labelled a through h, as denoted in FIG. 2. The values of bits Y0, Y1 and Y2 identify, in accordance with the assignment scheme shown in FIG. 3, the particular one of the eight subsets the symbol currently being identified is to come from while the values of bits Y3 through Y6 identify a particular one of the sixteen symbols within the identified subset.

Figure 2:
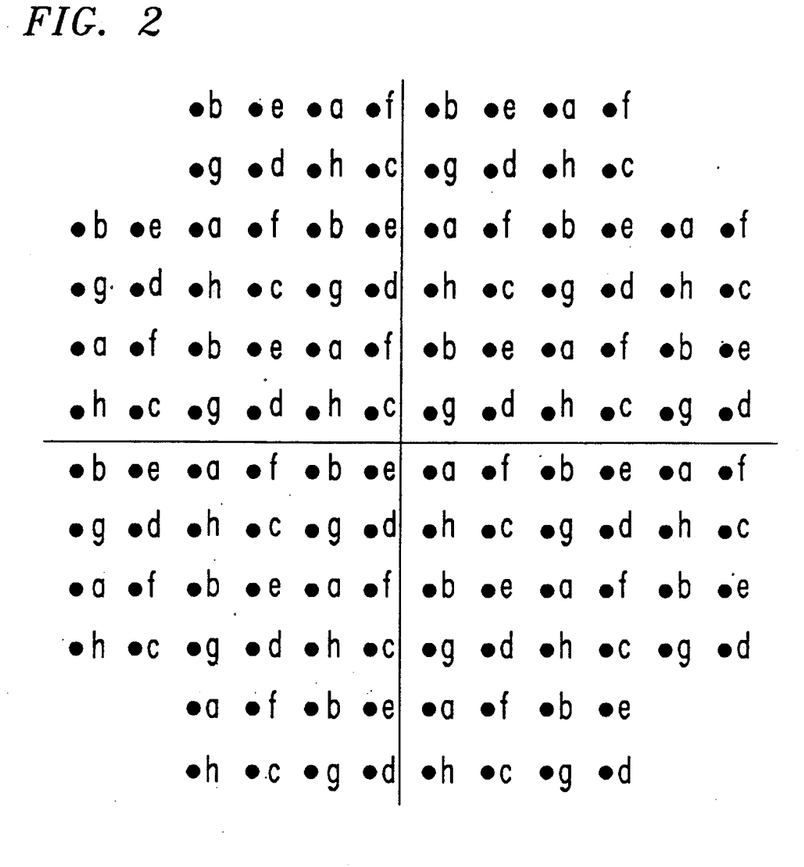
FIG. 2 shows the signal constellation used in the duplex wideband network termination of FIG. 1.
Figure 3:
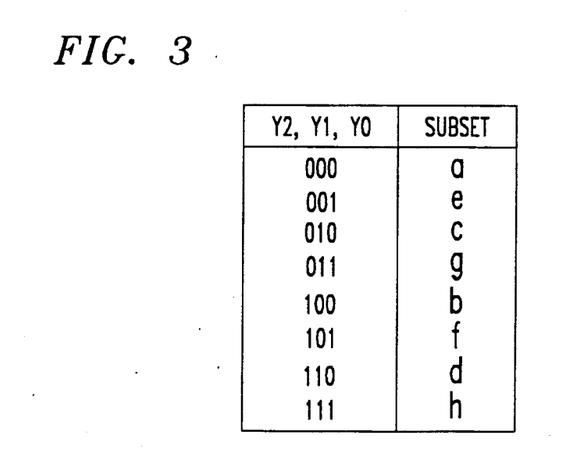
FIG. 3 is a table useful in explaining the operation of the coder within the duplex wideband network termination of FIG. 2.

The assignment of each of the sixteen different combinations of the values of bits Y3 through Y6 to a particular symbol within the identified subset can be arbitrary. However, by appropriate choice of a) the so-called trellis code used by trellis coder 140 to generate bits Y0, Y1 and Y2, b) the constellation, and c) the partitioning of the constellation into particular subsets, so-called "coding gain" is achieved. Such coding gain manifests itself in the form of enhanced receiver immunity to channel noise as compared to the channel noise immunity of an "uncoded" system in which each symbol of (in this example) a 64-symbol constellation would be used to directly represent a different one of the $2^6=64$ different combinations of the values of bits X1 through X6.

A circuit embodiment of trellis coder 140 is explicitly shown in FIG. 1. Specifically, trellis coder 140 is a finite-state machine which includes delay elements 181, 182 and 183 and exclusive-OR gates 184 and 185. Each of the delay elements imparts a symbol interval delay of T seconds to its inputs, where T is the reciprocal of the symbol rate, i.e., T=1/80,000. The inputs of exclusive-OR gate 184 are bit X1 and the output of delay element 181. The inputs of exclusive-OR gate 185 are bit X2 and the output of delay element 182. Delay element 181 receives as its input the output of delay element 183; delay element 182 receives as its input the output of exclusive-OR gate 184; and delay element 183 receives as its input the output of exclusive-OR gate 185. The output of delay element 183 also serves as output bit Y0.

The underlying premise of trellis coding is that, at any point in time, only the points in particular subsets of the constellation are allowed to be transmitted, depending on the so-called state of the trellis coder. The trellis diagram of FIG. 4, for example, represents the operation of trellis coder 140.

Figure 4:
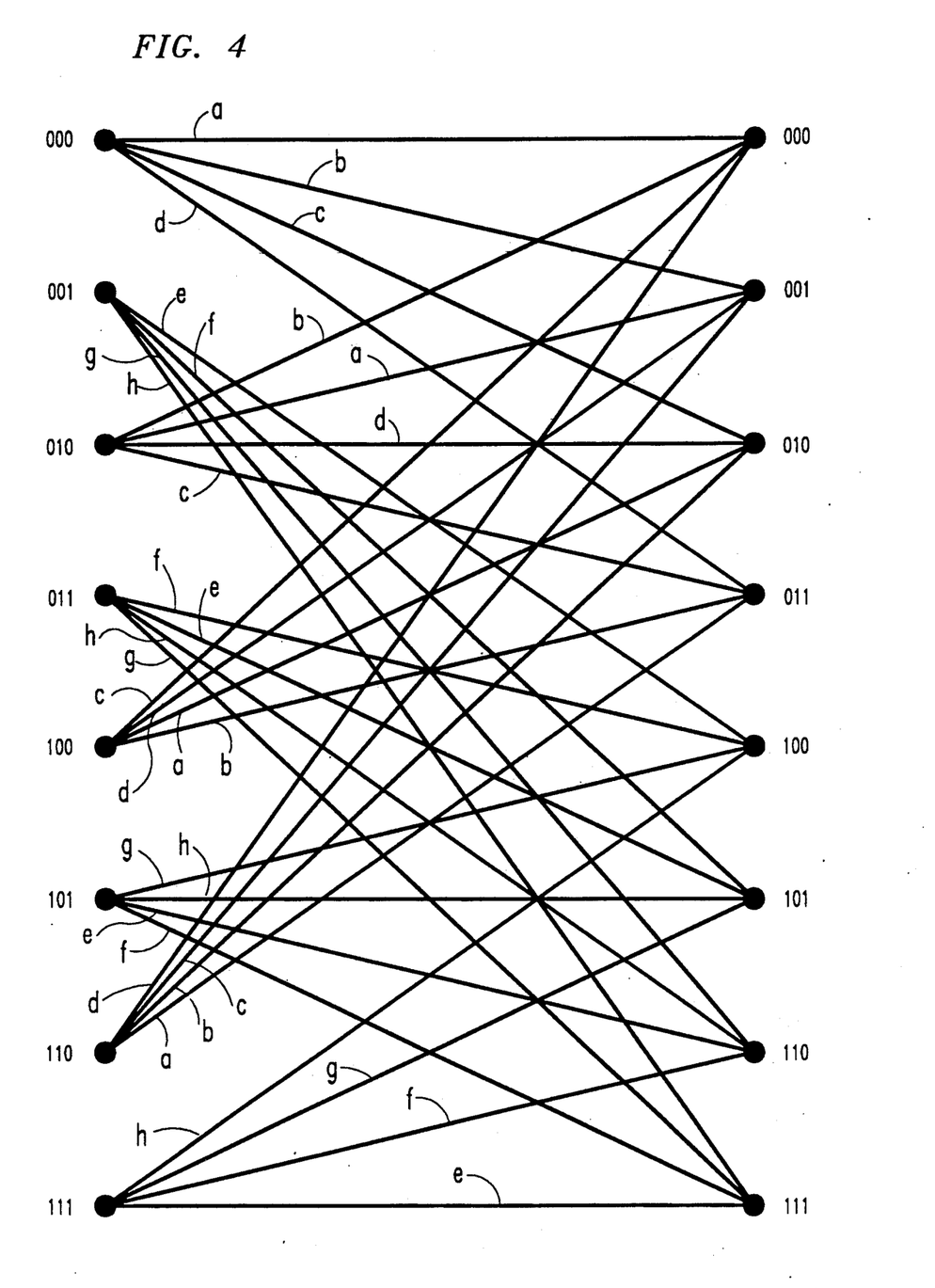
FIG. 4 is a trellis diagram graphically depicting the so-called convolutional code used in the duplex wideband network termination of FIG. 3.

In particular, trellis coder 140 has eight "states", binary 000 through binary 111, given by the values of the bits currently stored in delay elements 181, 182 and 183. Thus, for example, if the coder is in state 001, this means that delay elements 181 and 182 each currently hold a "0" and delay element 183 currently holds a "1". The two vertical lines of points in FIG. 4 represent the eight possible coder states at successive time intervals, and the lines, or edges, connecting various pairs of states indicate the possible state transitions. Thus, for example, it is possible for the coder to transition from state 010 to state 001 but not to state 100.

Each of these connecting lines bears a label indicating which subset the symbol being generated is to come from. Thus, continuing the example above, assume that the current state of the coder—i.e., the contents of delay elements 181, 182 and 183—is 010 and that, after the next six-bit word is supplied by serial-to-parallel converter 113, the new state is state 001. This means that the next signal point to be output is to come from subset "a" since the line connecting state 010 in the left column to state 001 in the right column is so labeled. With the coder now in state 001, the next signal point to be output will come from one of the subsets "e", "f", "g" or "h", depending on the upcoming values of X1 and X2.

Bit-to-symbol converter 177 provides on its output leads 102 and 103 the so-called in-phase and quadrature-phase components, respectively, of the channel symbol identified by bits Y0-Y6. In terms of the constellation diagram of FIG. 2, these components represent the "x" and "y" components of the selected symbol. Leads 102 and 103 extend to complex shaping filter 116, which generates a passband signal which is illustratively a so-called "carrierless AM/PM" signal.

Implementationally, complex shaping filter 116 is illustratively comprised of two finite-impulse-response digital filters of conventional design—in-phase filter 191 and quadrature phase filter 192—which filter the signals on leads 102 and 103, respectively. Each of these filters is illustratively realized as a transversal filter. Filters 191 and 192 differ from each other only in that their phase characteristics are offset from one another by $\pi/2$. This phase difference enables the receiver section of the associated DWLT to separately reconstruct the signals on leads 102 and 103. The outputs of filters 191 and 192 are combined in an adder 193 to provide a digital version of the desired outbound line signal.

It is important to note that the approach taken within complex shaping filter 116 for generating a passband signal in response to the two-dimensional symbols represented by the signals on leads 102 and 103 is different from the modulation typically used in, for example, voiceband modems, such as quadrature amplitude modulation, or QAM. In the latter, specifically, an explicit or implicit (depending on the implementation) rotation of the symbols by a carrier-frequency-dependent angle occurs. However no such explicit or implicit rotation is performed with carrierless AM/PM. This is significant because unless there happens to be an integral relationship between the carrier frequency and the symbol interval T (which is not likely to be the case if the carrier frequency and symbol interval values are chosen to optimize the performance of the transmission scheme as a whole), the aforementioned rotation operation will involve a non-trivial multiplication, thereby adding not insignificantly to the cost of the transmitter section. A further advantage is that carrierless AM/PM is more simply processed at the receiver than, for example, QAM. Additionally, carrierless AM/PM is potentially more robust in the presence of non-linearities, such as may be introduced in the analog-to-digital conversion performed in the receiver.

The output of complex shaping filter 116 is converted to analog form by D/A converter 117 whose output is then passed through low pass filter 118 to remove the higher-frequency images of the desired signal. Hybrid 126 thereupon extends the resulting outgoing line signal appearing on transmitter section output lead 119 to its two-wire side and thence onto local loop 60.

Turning now to the inbound transmission direction, the line signal generated on local loop 60 by the associated DWLT is received by hybrid 126 which routes that signal on to receiver section 123 and, more particularly, low-pass filter 142 thereof. The latter filters out energy in the received signal at frequencies nominally above the spectrum of the transmitted signal. The resulting filtered signal passes to gain control circuit 147 which is programmable to adjust the gain imparted to its input so as to make maximum use of the precision of A/D converter 148 which follows. The gain of circuit 147 is set, based on the level of its input signal during modem initialization or retraining, and is thereafter held at the initially set value, in accordance with standard practice for echo-canceller-based data communications.

Receiver section 123 further includes a clock 143, which generates a predetermined number of clock pulses every T seconds on lead 144. These are received by receiver timing generator 145, which counts the pulses on lead 144 and generates timing signals on a number of output leads to control the sequencing of the various signal processing functions within the receiver. One of these leads, shown explicitly, is lead 146. The latter extends pulses to A/D converter 148 at a rate which causes A/D converter 148 to generate on its output lead 149 samples of the received signal, referred to as "line samples", at 3/T samples per second.

Each of the samples on lead 149 includes an echo component that is dominantly comprised of so-called "near echo" in the form of energy on transmitter section output lead 119 that "leaks" through hybrid 126 and is secondarily comprised of so-called "far echo" arising from reflections of the transmitted signal in the transmission channel. Echo canceller 127, in response to the symbols represented on leads 102 and 103, generates digital samples each representing the echo component of a respective one of the samples on lead 149. This echo replica signal is subtracted from the samples on lead 149 in subtracter 128 to provide an echo-compensated signal on lead 152.

The echo compensated signal on lead 152, in addition to being further processed as described below to recover the bit stream communicated from mux-demux 50 is also used by echo canceller 127 as an error signal in response to which it adapts its transfer function in such a way as to minimize the residual echo component of the signal on lead 152. Echo canceller 127 is illustratively of the type shown in U.S. Pat. No. 4,464,545 issued Aug. 7, 1984 to J. Werner, hereby incorporated by reference. Among its more significant parameters, echo canceller 127 illustratively has a memory span of 40 symbols, adaptation step size of $2^{-20}$ and arithmetic precision of 26 bits using fixed point arithmetic. These parameters are expected to provide at least 65 dB of near echo attenuation, this being the likely minimum necessary level of near echo cancellation for this application.

The line samples on subtracter output lead 152 generated during the $n^{th}$ receiver symbol interval are denoted $r_{1n}$, $r_{2n}$ and $r_{3n}$. These three line samples are passed to Viterbi decoding/DFE circuitry 150 for further processing to be described hereinbelow. It may be noted at this point, however, that line samples $r_{1n}$, $r_{2n}$ and $r_{3n}$ are also applied to timing recovery circuit 153, which uses them to control timing generator 145. (Other types of timing recovery schemes, such as those employing out-of-band tones or other out-of-band signals might alternatively be used.) Although, as noted above, the associated DWLT may be regarded as substantially identical to DWNT 101, one small difference is that that DWLT illustratively does not include a timing recovery circuit corresponding to timing recovery circuit 153. Rather, the receiver timing generator in that DWLT operates exclusively in response to the clock therein, the latter, in turn, being controlled by a network timing signal provided from within the central office. The frequency of the clock the DWLT thus becomes the controlling frequency for the operations of both the transmitter and receiver sections of both DWNT 101 and the associated DWLT.

Figure 5:
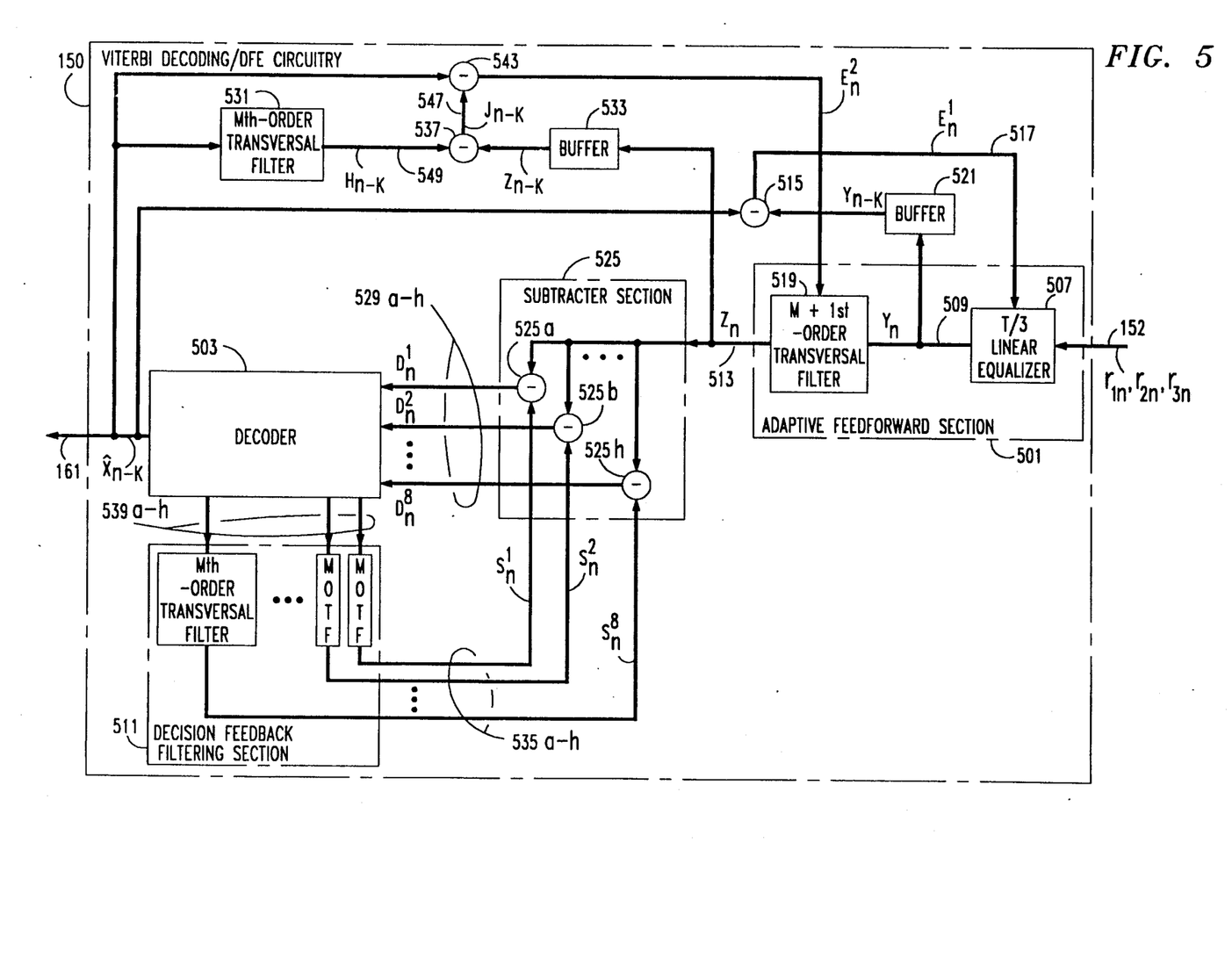
FIG. 5 is a block diagram of a circuitry embodying the principles of the present invention, which performs equalization and decoding of received signals in the duplex wideband network termination of FIG. 1.

As previously noted, line samples $r_{1n}$, $r_{2n}$ and $r_{3n}$ on lead 152 are further processed by Viterbi decoding/DFE circuitry 150 as illustrated in FIG. 5.

Turning to FIG. 5, circuitry 150 principally comprises adaptive feedforward section 501, decision feedback filtering section 511, subtracter section 525 and decoder 503. These circuit components form the basic structure of an optimal decision feedback equalizer with trellis decoding which, in accordance with the present invention, not only substantially eliminates the intersymbol interference attendant to the received line samples, but also provides substantially the full coding gain of the trellis code used in coder 140.

Adaptive feedforward section 501 of the optimal decision feedback equalizer eliminates the so-called "precursors" in the line samples.

Specifically, line samples $r_{1n}$, $r_{2n}$ and $r_{3n}$ are applied to linear equalizer 507 within adaptive feedforward section 501. Linear equalizer 507 is of conventional design and may be, for example, of the type disclosed in U.S. Pat. No. 3,868,603 issued Feb. 25, 1975 to Guidoux, hereby incorporated by reference. Since linear equalizer 507 receives and processes more than one input for each symbol interval, it is referred to as a "fractionally spaced" equalizer. It is, more specifically, referred to as a T/3 type of fractionally spaced equalizer since it receives and processes inputs at a rate of three per symbol interval, and thus has a so-called "tap" spacing of T/3. A fractionally spaced linear equalizer is advantageous as compared to a so-called symbol-interval-spaced equalizer because, for example, it is insensitive to phase distortion in the channel and to the epoch with which the line samples are formed.

The outputs of T/3 linear equalizer 507 on lead 509 are generated once per symbol interval and are, respectively, the real and imaginary components $y_n$ and $y_n^*$ of a complex signal $Y_n$. Equalizer 507 uses as an input an error signal indicative of the difference between the output signal thereof and decisions thereafter made in the receiver as to what the transmitted symbols actually were. A particular one of these decisions provided by decoder 503 during the $n^{th}$ receiver symbol interval is a complex signal $X_{n-K}$ having, respectively, the real and imaginary components $X_{n-K}$ and $X_{n-K}$. K is an experimentally determined constant delay needed to decode a particular trellis code by the conventional Viterbi algorithm. (In the present embodiment, the trellis code used in coder 140 experimentally requires K=15).

As a result of the delay in decoder 503, the formation of the aforementioned error signal, hereinafter denoted $E_n^1$, involves storing $Y_n$ in buffer 521 for K symbol intervals so that the current output thereof is complex signal $Y_{n-K}$ which was the output from linear equalizer 507 K symbol intervals ago. $Y_{n-K}$ has real and imaginary components, respectively, $y_{n-K}$ and $y_{n-K}^*$. Subtracter 515 provides on its output lead 517 complex error signal $E_n^1$ having real and imaginary components, respectively, $e_n^1$ and $e_n^{1*}$, where $e_n^1 = (y_n - X_n)$ and $e_n^{1*} = (y_n^* - X_n^*)$. This error signal $E_n^1$ is supplied to linear equalizer 507 for the purpose of coefficient updating in a conventional manner.

Returning briefly to the description of $Y_n$ on lead 509, the character of the noise that appears in $Y_n$ is dependent upon the characteristics of the channel over which the symbols were transmitted. In this particular illustrative embodiment, the channel being a local loop, like many other channels, contributes to the transmitted symbols mostly the so-called "colored", rather than "white" or Gaussian, noise arising from cross-talk within the transmission cable.

However, the trellis codes that have been developed to date, including, for example, the code represented by the trellis diagram of FIG. 4, are known to provide coding gain in the presence of "white" noise.

This being so, in order to substantially realize the full coding gain of the trellis code used, the noise that appears in trellis-coded signals to be processed by decoder 503 is, by design, in accordance with the present invention, whitened before being decoded.

To this end, $Y_n$ on lead 509 is input to conventional M+1st- order transversal filter 519 which whitens the noise that appears therein. Thus, transversal filter 519 within adaptive feedforward section 501 outputs on lead 513 complex signal $Z_n$ whose noise component is white. This ensures that the noise appearing in the input to decoder 503, which is solely contributed by the noise component of $Z_n$, is white.

Specifically, $Z_n$ has, respectively, real and imaginary components $z_n$ and $z_n^*$. Transversal filter 519 generates its output by forming linear combinations of the filter input components in accordance with the relations:

$$z_n = y_n + P_n^T u_n, \text{ and}$$

$$z_n^* = y_n^* + P_n^T u_n^*.$$

In these expressions, $u_n$ and $u_n^*$ are (M×1) matrices, or vectors, respectively comprised of the M most recent real and imaginary output sample components of linear equalizer 507. That is $$u_n = \begin{bmatrix} y_{n-1} \\ y_{n-2} \\ \cdot \\ \cdot \\ y_{n-M} \end{bmatrix}, \text{ and } u_n^* = \begin{bmatrix} y_{n-1}^* \\ y_{n-2}^* \\ \cdot \\ \cdot \\ y_{n-M}^* \end{bmatrix},$$

where M is a selected finite integer. The value of M is intrinsic to the characteristics of the channel used. (In the present embodiment, the channel being a typical two wire local loop, the value of M associated therewith is experimentally determined to be 7.)

$P_n$ is an (M×1) vector or matrix comprised of an ensemble of M tap coefficients associated with transversal filter 519. That is $$P_n = \begin{bmatrix} p_n^1 \\ p_n^2 \\ \cdot \\ \cdot \\ p_n^M \end{bmatrix},$$

where $p_n^1, p_n^2 \ldots p_n^M$ are values of the respective M tap coefficients at the $n^{th}$ receiver interval. (The superscript "T" used in the above expressions indicates the matrix transpose operation wherein (M×1) vector $P_n$ is transposed into (1×M) vector for the purpose of matrix multiplication.)

The values of the coefficients in $P_n$ are initially set in a conventional manner by means of a standard training sequence input to transversal filter 519, and are thereafter updated in a conventional manner, based on a complex error signal, namely $E_n^2$, input thereto.

$E_n^2$ is formed by substracter 543 which is identical to subtracter 515 as described before. Specifically, subtracter 543 subtracts the real and imaginary components of $X_{n-K}$, the current decision output of decoder 503, from the corresponding components of $J_{n-K}$ on lead 547. $J_{n-K}$ is formed by subtracter 537 which performs a function similar to that of the aforementioned subtracter 515. That is subtracter 537 subtracts the real and imaginary components of complex signal $H_{n-K}$ on lead 549 from the corresponding components of $Z_{n-K}$ at the output of buffer 533. The latter is identical to buffer 521 as described before and stores $Z_n$ on lead 513 therein for K symbol intervals.

Complex signal $H_{n-K}$ on lead 549, as mentioned before, comprises real and imaginary components, which are denoted, respectively, $h_{n-K}$ and $h_{n-K}^*$. These components are generated by Mth-order transversal filter 531 of conventional design, which forms linear combinations of input components thereof in accordance with the relations:

$$h_{n-K} = P_n^T v_n, \text{ and}$$

$$h_{n-K}^* = P_n^T v_n^*,$$

where M and matrix $P_n$ are as described before. In these expressions $v_n$ and $v_n^*$ are (M×1) matrices, or vectors, comprised of respectively the M most recent real and imaginary components of the output of decoder 503 whose operation is to be described hereinbelow. That is $$v_n = \begin{bmatrix} x_{n-K-1} \\ x_{n-K-2} \\ \cdot \\ \cdot \\ x_{n-K-M} \end{bmatrix}, \text{ and } v_n^* = \begin{bmatrix} x_{n-K-1}^* \\ x_{n-K-2}^* \\ \cdot \\ \cdot \\ x_{n-K-M}^* \end{bmatrix}.$$

In order to appreciate the function of decoder 503, the algorithm that orchestrates the operation thereof needs to be described. This algorithm, residing in decoder 503, is referred to, hereinafter, as the Viterbi/DFE (V/DFE) algorithm and is substantially identical to the Viterbi algorithm of conventional design. Details on the Viterbi algorithm can be referred to G. Ungerboeck, "Channel Coding With Expanded Signal Sets," *IEEE Trans. on Information Theory*, Vol. IT-28, No. 1, January, 1982, and G. Ungerboeck, "Trellis-Coded Modulation With Redundant Signal Sets, Part I and II," *Communications Magazine, IEEE Communication Society*, February 1987. Also of interest is the discussion in G. D. Forney, "The Viterbi Algorithm", *Proceedings of the IEEE*, Vol. 761, pp. 268–278, March 1973.

The V/DFE algorithm, like the Viterbi algorithm, based on the input of decoder 503 and the knowledge of the trellis code used in coder 140, forms a plurality of sequences of tentative decisions as to what the transmitted symbols were from the aforementioned associated DWLT. These sequences of tentative decisions are defined by the so-called "survival paths" which are realized in a trellis diagram. The theory of the Viterbi algorithm predicts that all of the survival paths merge to the so-called "maximum-likelihood path" going back in time. Based on the latter, a decoder outputs the so-called "maximum-likelihood" decisions with a delay of K symbol intervals as previously mentioned.

In fact, the V/DFE algorithm, based on the same principles of the Viterbi algorithm, renders eight survival paths in the decoding process involving the trellis code illustratively used in the present embodiment.

The V/DFE algorithm is described in further detail hereinbelow with the description of the actual operation of decoder 503. It suffices to know for now that the V/DFE algorithm directs decoder 503 to output eight sequences of tentative decisions defined by the aforementioned eight survival paths, respectively, on to leads 539a–h, and the corresponding maximum likelihood decisions on to lead 161.

Returning now to the processing of $Z_n$ on lead 513, $Z_n$ is corrupted not only with the aforementioned white noise, but also the so-called "post-cursors" that contribute to the intersymbol interference thereof. In accordance with the theory of DFE, these post-cursors can be eliminated from $Z_n$ by a feedback process which involves replicating the post-cursors by linear-filtering of the most recent decisions as to the values of transmitted symbols. However, decoder 503 is susceptible to feedback errors caused by an incomplete elimination of the post-cursors due to, for example, use of relatively inaccurate decisions in that feedback process.

The resulting need of accurate decisions naturally calls for the aforementioned "maximum likelihood" decisions from decoder 503. However, these decisions, because of the relatively long—K symbol interval—delay in the production thereof, cannot be used as the "most recent" decisions as required.

In accordance with the present invention, that need is satisfied using, instead, tentative decisions defined by the aforementioned survival paths. That is, the post-cursors are replicated by linear-filtering of those tentative decisions and thereby eliminated from $Z_n$.

As noted before, because of the particular trellis code used in the present embodiment, there are eight such survival paths which respectively define eight sequences of tentative decisions. In accordance with the present invention, each of these sequences is used and linear-filtered by an Mth-order transversal filter.

To this end, feedback filtering section 511 comprises eight such Mth-order transversal filters serving in parallel the eight sequences of tentative decision input thereto. Each of these filters is identical to transversal filter 531 as described before. Specifically, decision feedback filtering section 511 takes in eight groups of M most recent tentative decisions of individual ones of the aforementioned eight sequences from respective leads 539a–h. These eight groups of tentative decisions thus taken in can be mathematically represented as elements of, respectively, columns 1–8 of matrix TD (M×8). That is $$TD = \begin{bmatrix} td^1_{n-1} & td^2_{n-1} & \cdots & td^8_{n-1} \\ td^1_{n-2} & td^2_{n-2} & \cdots & td^8_{n-2} \\ \cdot & \cdot & \cdots & \cdot \\ \cdot & \cdot & \cdots & \cdot \\ \cdot & \cdot & \cdots & \cdot \\ td^1_{n-M} & td^2_{n-M} & \cdots & td^8_{n-M} \end{bmatrix},$$

where elements $td_{n-1}^1$, $td_{n-2}^1$ ... an $td_{n-M}^1$ of the first column of TD represent the M most recent tentative decisions associated with a first one of the eight survival paths; $td_{n-1}^2, td_{n-M}^2$ of the second column of TD associated with a second one of the paths; and so on and so forth.

Decision feedback filtering section 511 accordingly generates on leads 535a–h, repectively, complex signals $S_n^1, S_n^2, S_n^3, S_n^4, S_n^5, S_n^6, S_n^7$, and $S_n^8$ in accordance with the relations $$Re[S_n^1 \; S_n^2 \; S_n^3 \; S_n^4 \; S_n^5 \; S_n^6 \; S_n^7 \; S_n^8] = P_n^T(Re(TD))$$

$$Im[S_n^1 \; S_n^2 \; S_n^3 \; S_n^4 \; S_n^5 \; S_n^6 \; S_n^7 \; S_n^8] = P_n^T(Im\;(TD))$$

where Re is an operation that eliminates the imaginary components of the matrix elements and Im is another operation that eliminates the real components of same. For example, $Re[2+i3\;4+i8]=[2\;4]$ and $Im\;[2+i3\;4+i8]=[3\;8]$.

It is noteworthy at this point that transversal filters 519, 531 and those of decision feedback filtering section 511 in the present embodiment use the same copy of Pn or the ensemble of the tap coefficients. This advantageously facilitates the adaptive process in Viterbi decoding/DFE circuitry 150 because during each symbol interval, only one set of coefficients needs to be updated.

Continuing the processing of $Z_n$ on lead 513, subtracter section 525 contains eight subtracters 525a–h each identical to subtracter 515 as described before. Subtracters 525a–h take in, respectively, complex signals $S_n^1, S_n^2, S_n^3, S_n^4, S_n^5, S_n^6, S_n^7$, and $S_n^8$ on respective leads 535a–h as one set of inputs, and eight replicas of $Z_n$ as another set. These subtracters each perform on the inputs the function identical to that of subtracter 515. For example, subtracter 525a subtracts the real and imaginary components of $S_n^1$ on lead 535a from the corresponding components of a replica of $Z_n$ and the result therefrom is output on to lead 529a. Similarly, the rest of the subtracters 525b–h each operate on corresponding pairs of inputs and provide the results therefrom on respective leads 529b–h. The resulting complex signals on leads 529a–h are denoted, respectively, $D_n^1$, $D_n^2$, $D_n^3$, $D_n^4$, $D_n^5$, $D_n^6$, $D_n^7$, and $D_n^8$.

The ensemble of $D_n^1, D_n^2 \ldots D_n^8$ is input to decoder 503 whose operation is run by the aforementioned V/DFE algorithm. The latter, like the Viterbi algorithm, forms the aforementioned survival paths that define the tentative decisions as to the transmitted symbols by keeping track of the so-called "metrics" and "transition states" associated therewith. In accordance with the Viterbi algorithm, a metric is a cumulative value of individual squared Euclidean distances between the tentative decisions associated with an individual one of the survival paths and the received symbols input to the decoder. Upon receiving an input by the decoder, the V/DFE algorithm, like the Viterbi algorithm, initiates for each of individual survival paths a state transition during which a tentative decision as to the transmitted symbol associated with that input is made. A concomitant with the state transition is an increment in the metric associated with each of those individual survival paths. This being so, the actual state transition and the tentative decision associated with each of those paths are made so as to minimize the concomitant metric increment.

In the present illustrative embodiment, the difference between the Viterbi algorithm and the V/DFE algorithm is that during a state transition, the latter involves a calculation of thirty-two metric increments rather than eight in the former. This stems from that in accordance with the present invention, an ensemble of the aforementioned eight signals—$D_n^1, D_n^2 \ldots D_n^8$, rather than normally one signal, is input to decoder 503.

Referring to FIG. 4, it can be used to depict a transition between the current states and the next states of individual survival paths in the decoding process. In fact, each of the eight survival paths in the present embodiment assumes one of the eight current states. In accordance with FIG. 4, the current state of a particular one of the survival paths can possibly transition to one of four next states. For example, a particular survival path with the current state 000 can possibly transition to 000,001,010 and 011 of the next states. Since there are altogether thirty-two possible transitions for the eight survival paths, the V/DFE algorithm computes thirty-two metric increments associated therewith. Because of using the aforementioned eight different inputs to decoder 503 for forming the eight survival paths, these thirty-two metric increments are distinct from one another. But if one input is used, as normally, for all of the eight survival paths, it turns out that only eight of the thirty-two metric increments are distinct. Recognizing this as a shortcut, a conventional Viterbi algorithm thus needs to compute only eight metric increments.

Other than the aforementioned deviation, the V/DFE algorithm is virtually the same as the conventional Viterbi algorithm. In particular, the former, as mentioned before, directs decoder 503 to make the "maximum likelihood" decisions as to what the most likely sequence of transmitted two-dimensional symbols was. Signals identifying those symbols are output by decoder 503 on lead 161.

Returning to FIG. 1, such signals on lead 161 are input to symbol-to-bit-converter 162 which performs the inverse function of bit-to-symbol converter 177, thereby recovering the values of bits Y0 through Y7. Since the values of Y0 through Y6 are identical with the values of X0 through X6, these values can be directly passed through parallel-to-serial converter 164 and descrambler 165 in order to provide the bit stream that was input to the associated DWLT.

The foregoing merely illustrates the principles of the invention and those skilled in the art will be able to devise numerous arrangements which, although not explicitly shown or described herein, embody the principles of the invention. By way of example, but not limitation, some possible variations and alternatives will now be described.

For example, the illustrative embodiment discloses the invention in the context of a DWNT used in an ISDN environment. However, the present invention is equally usable in a voiceband modem communicating on, e.g., a voiceband telephone channel, at a bit rate of at least 19.2 kb/s, e.g., 24 kb/s or even higher.

The invention has been disclosed in the context of a circuit-oriented ISDN environment. However, it can also be used to provide high-speed data transmission in totally packetized non-ISDN environments, as well. It is, in addition, usable for use not only in telephone local loop transmission, but other suitable environments. Thus, for example, a DWNT embodying the principles of the invention could be used to interconnect—over a telephone local loop or other transmission loop—a local area network and a wide area network; a telephone central office and a local area network; a PBX and a central office, two PBXs, etc. In addition, in particular applications it may be advantageous to implement the DWNT in a "data over voice" mode in which the spectrum of the DWNT line signal is positioned so as to leave room at the lower end of the frequency spectrum for the insertion of an accompanying voice signal.

The invention has been disclosed using carrierless AM/PM. However, other passband transmission schemes, including non-carrierless schemes such as quadrature-amplitude modulation, can be used to implement the invention. Similarly, although the illustrative embodiment utilizes a two-dimensional modulation scheme, the invention can be implemented using modulation schemes of any other desired dimensionality, including, for example, one-, four- or eight-dimensions. Advantageously, a multi-dimensional modulated signal may be more robust in the presence of particular channel impairments than, say, a one-dimensional, e.g., single sideband, modulated signal. In addition, as long as the coordinates of the symbol in each dimension are dependent—that is, each coordinate is a function of all of the data bits that the symbol represents, rather than being an independent function of some subset of those bits—increasing the dimensionality of the symbols increases the margin against noise and various channel impairments. Indeed, the improved receiver error performance may be sufficiently significant to make worthwhile the added implementational complexity of using, say, four or eight dimensions.

The invention has been illustrated in the context of a network termination which operates at 480 kb/s. However, it could be used at this were found to be desirable.

The illustrative embodiment discloses the invention in the context of transmission over a two-wire loop. An alternative, however, is to use a four-wire loop, i.e., a separate two-wire loop for each direction of transmission, in which case, of course, no echo cancellation would be needed.

Finally, the invention is disclosed herein in a form in which the various signal processing functions are performed by discrete functional blocks, for example, the transversal filters in the present illustrative embodiment. However, any one or more of these functions could equally well be performed by one or more appropriately programmed microprocessors, microcoded digital signal processing chips, etc.

We claim:

1. Apparatus for recovering information from a received signal corrupted by noise which is dominantly colored, said information being encoded using a code which provides optimum immunity to noise which is white, said apparatus comprising
   means for filtering said received signal corrupted by noise which is dominantly colored to provide a filtered signal corrupted by noise which is dominantly white, and
   means for decoding the filtered signal corrupted by noise which is dominantly white to recover said information.

2. The invention of claim 1 wherein said code is a trellis code.

3. The invention of claim 2 wherein the decoding means recovers said information using Viterbi decoding and said apparatus further comprises means for filtering tentative decisions generated by said Viterbi decoding to generate at least one feedback signal, said Viterbi decoding being performed in response to said at least one feedback signal and said filtered signal.

4. The invention of claim 3 wherein said tentative decisions are defined by individual ones of the survival paths associated with said Viterbi decoding.

5. The invention of claim 4 wherein the tentative-decision filtering means generates a particular number of feedback signals, said particular number being the number of said survival paths associated with said Viterbi decoding.

6. Apparatus for processing received signals which are encoded in a trellis code, said apparatus comprising
   means responsive to an individual one of said received signals for generating a feedforward signal, said feedforward signal including intersymbol interference, and
   means for Viterbi decoding said feedforward signal and for eliminating said intersymbol interference in response to said feedforward signal and at least one feedback signal which is generated in response to tentative decisions defined by the survival paths associated with said Viterbi decoding.

7. The invention in claim 6 wherein said received signals are corrupted by noise which is dominantly other than white, and wherein the generating means includes means for whitening said noise and generates said feedforward signal containing the resulting white noise.

8. The invention in claim 6 wherein the decoding means is responsive to a particular number of feedback signals, said particular number being the number of said survival paths associated with said Viterbi decoding.

9. Apparatus for processing received signals corrupted by noise which is dominantly colored, said received signals being encoded using a code which provides optimum immunity to noise which is white, each of said received signals being associated with an individual one of a plurality of symbols having predetermined values, said apparatus comprising
   a feedforward section for filtering an individual one of said received signals corrupted by noise which is dominantly colored to provide a filtered signal corrupted by noise which is dominantly white, and
   means for decoding the filtered signal corrupted by noise which is dominantly white to determine the value of the symbol associated with said individual one of said received signals corrupted by noise which is dominantly colored.

10. The invention of claim 9 wherein said feedforward section comprises at least a fractionally spaced linear equalizer.

11. The invention of claim 9 wherein said code is trellis code.

12. The invention of claim 11 wherein the decoding means determines said value of said symbol using Viterbi decoding and said apparatus further comprises means for filtering tentative decisions generated by the Viterbi decoding to generate at least one feedback signal, said Viterbi decoding being performed in response to said at least one feedback signal and said filtered signal.

13. The invention of claim 12 wherein the tentative-decision filtering means generates a particular number of feedback signals, said particular number being the number of the survival paths associated with said Viterbi decoding.

14. Apparatus for processing received signals which are encoded with a trellis code, each of said received signals being associated with an individual one of a plurality of symbols having predetermined values, said apparatus comprising
   a feedforward section responsive to an individual one of said received signals for generating a feedforward signal, said feedforward signal including intersymbol interference, and
   means for forming a decision as to the value of the symbol associated with said individual one of said received signals using Viterbi decoding and for eliminating said intersymbol interference in response to said feedforward signal and at least one feedback signal which is generated in response to tentative decisions defined by the survival paths associated with said Viterbi decoding.

15. The invention in claim 14 wherein said received signals are corrupted by noise which is dominantly other than white, and wherein said feedforward section includes means for whitening said noise and generates said feedforward signal containing the resulting white noise.

16. The invention in claim 14 wherein the decoding means is responsive to a particular number of feedback signals, said particular number being the number of said survival paths associated with said Viterbi decoding.

17. The invention of claim 14 wherein said feedforward section comprises at least a fractionally spaced linear equalizer.

18. A method for recovering information from a received signal corrupted by noise which is dominantly colored, said information being encoded using a code which provides optimum immunity to noise which is white, said method comprising the steps of
   filtering said received signal corrupted by noise which is dominantly colored to provide a flittered signal corrupted by noise which is dominantly white, and
   decoding the filtered signal corrupted by noise which is dominantly white to recover said information.

19. The invention of claim 18 wherein said code is a trellis code.

20. The invention of claim 19 wherein the decoding step recovers said information using Viterbi decoding and said method further comprises the step of filtering tentative decisions generated by said Viterbi decoding to generate at least one feedback signal, said Viterbi decoding being performed in response to said at least one feedback signal and said filtered signal.

21. The invention of claim 20 wherein said tentative decisions are defined by individual ones of the survival paths associated with said Viterbi decoding.

22. The invention of claim 21 wherein the tentative-decision filtering step generates a particular number of feedback signals, said particular number being the number of said survival paths associated with said Viterbi decoding.

23. A method for processing received signals which are encoded in a trellis code, said method comprising the steps of generating a feedforward signal in response to an individual one of said received signals, said feedforward signal including intersymbol interference, and Viterbi decoding said feedforward signal and eliminating said intersymbol interference in response to said feedforward signal and at least one feedback signal which is generated in response to tentative decisions defined by the survival paths associated with said Viterbi decoding.

24. The invention in claim 23 wherein said received signals are corrupted by noise which is dominantly other than white, and wherein the generating step includes the substep of whitening said noise and generates said feedforward signal containing the resulting white noise.

25. The invention in claim 23 wherein the Viterbi decoding step is responsive to a particular number of feedback signals, said particular number being the number of said survival paths associated with said Viterbi decoding.

26. A method for processing received signals corrupted by noise which is dominantly colored, said received signals being encoded using a code which provides optimum immunity to noise which is white, each of said received signals being associated with an individual one of a plurality of symbols having predetermined values, said method comprising the steps of filtering an individual one of said received signals corrupted by noise which is dominantly colored to provide a filtered signal corrupted by noise which is dominantly white, and decoding the filtered signal corrupted by noise which is dominantly white to determine the value of the symbol associated with said individual one of said received signals corrupted by noise which is dominantly colored.

27. The invention of claim 26 wherein said code is a trellis code.

28. The invention of claim 27 wherein the decoding step determines said value of said symbol using Viterbi decoding and said method further comprises the step of filtering tentative decisions generated by the Viterbi decoding to generate at least one feedback signal, said Viterbi decoding being performed in response to said at least one feedback signal and said filtered signal.

29. The invention of claim 28 wherein the tentative-decision filtering step generates a particular number of feedback signals, said particular number being the number of the survival paths associated with said Viterbi decoding.

30. A method for processing received signals which are encoded with a trellis code, each of said received signals being associated with an individual one of a plurality of symbols having predetermined values, said method comprising the steps of generating a feedforward signal in response to an individual one of said received signals, said feedforward signal including intersymbol interference, and forming a decision as to the value of the symbol associated with said individual one of said received signals using Viterbi decoding and eliminating said intersymbol interference in response to said feedforward signal and at least one feedback signal which is generated in response to tentative decisions defined by the survival paths associated with said Viterbi decoding.

31. The invention in claim 30 wherein said received signals are corrupted by noise which is dominantly other than white, and wherein the generating step includes the substep of whitening said noise and generates said feedforward signal containing the resulting white noise.

32. The invention in claim 30 wherein the decision forming step is responsive to a particular number of feedback signals, said particular number being the number of said survival paths associated with said Viterbi decoding.

* * * * *